(12) United States Patent
Pulugurta et al.

(10) Patent No.: US 9,037,132 B1
(45) Date of Patent: May 19, 2015

(54) METHOD AND APPARATUS FOR ORIGINATION BASED ON DISTANCE AND DURATION

(75) Inventors: Srikanth Pulugurta, Woodstock, VA (US); Anoop K. Goyal, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 407 days.

(21) Appl. No.: 12/903,849

(22) Filed: Oct. 13, 2010

(51) Int. Cl.
*H04W 4/00* (2009.01)
*H04W 40/26* (2009.01)

(52) U.S. Cl.
CPC ..................... *H04W 40/26* (2013.01)

(58) Field of Classification Search
USPC ....................................................... 455/432.1
See application file for complete search history.

(56) References Cited

U.S. PATENT DOCUMENTS

| | | | |
|---|---|---|---|
| 6,223,042 B1 * | 4/2001 | Raffel | 455/455 |
| 6,748,217 B1 * | 6/2004 | Hunzinger et al. | 455/435.2 |
| 8,073,441 B1 * | 12/2011 | Unger et al. | 455/422.1 |
| 2002/0102974 A1 * | 8/2002 | Raith | 455/434 |
| 2003/0036389 A1 * | 2/2003 | Yen | 455/456 |
| 2003/0214928 A1 * | 11/2003 | Chuah | 370/336 |
| 2007/0190974 A1 | 8/2007 | Zhang | |
| 2007/0268877 A1 | 11/2007 | Buckley et al. | |

* cited by examiner

*Primary Examiner* — Gerald Johnson

(57) ABSTRACT

When a roaming wireless communication device seeks to originate a communication, the device may originate the communication in a roaming system because the device has not yet run a next scheduled scan for a more preferred, home, system. In the disclosed method, the device may evaluate a current distance from where the device was located when it successfully communicated to a home system and may further evaluate a current duration from that successful communication. If the distance is threshold short and perhaps further if the duration is threshold short, then the device may originate the communication in the home system without having detected the home system through a scheduled rescan. Further, to help expedite origination, the device may set its origination power at the power that it used for the last successful communication.

17 Claims, 3 Drawing Sheets

METHOD AND APPARATUS FOR ORIGINATION BASED ON DISTANCE AND DURATION

BACKGROUND

In typical cellular wireless communications, each end-user device (e.g., cell phone, personal digital assistant, wirelessly equipped personal computer, etc.) subscribes to service from a given cellular wireless carrier known as the device's home carrier. In practice, the home carrier will operate one or more radio access networks including base stations that radiate to define wireless coverage areas in which the end-user devices can operate. When a device enters into coverage of its home carrier's network, the device may register with the home carrier network and may then engage in wireless communication service via the home carrier's network, and the home carrier may accordingly charge or debit a service account of the device.

Although a typical cellular carrier may strive to offer wireless coverage throughout a region, such as nationally in the United States for instance, the carrier may not actually operate radio access networks in all locations throughout the region. To fill in gaps where the carrier does not operate its own radio access networks and thus where the carrier does not itself provide coverage, the carrier will typically enter into roaming agreements with other carriers. Under a roaming agreement, another carrier may agree to provide service to the home carrier's subscriber devices when the devices operate in the roaming carrier's network. Thus, when a device enters into coverage of a roaming carrier's network, the device may register for service with the roaming carrier's network and may then engage in wireless communication service via the roaming carrier's network. In accordance with the roaming agreement, the roaming carrier may then report that usage to the home carrier and may charge the home carrier for the usage. In turn, the home carrier may then pass that charge along to the service account of the device, or, for certain users, the home carrier may absorb the charge.

As a general matter, a home carrier may prefer to have its subscribers operate in coverage of the home carrier's network, rather than in coverage of a roaming carrier's network. One reason for this is that the home carrier will typically profit more when the home carrier charges the subscriber for use of the home carrier's network and services than when the home carrier merely passes a roaming carrier's charges along to the subscriber or absorbs the roaming charges. Another reason for this is that, when a subscriber is roaming, the subscriber may not benefit from full access to the home carrier's services and support, which may lead to poor user experience.

The choice of operating in home network coverage or roaming network coverage becomes an issue in a region where both home network coverage and roaming network coverage are provided. Throughout such a region, there may be some areas where the home carrier provides coverage and other areas where the home carrier does not provide coverage but a roaming carrier provides coverage, and there may be areas where both the home carrier and a roaming carrier provide coverage.

To promote subscriber operation in home network coverage, the home carrier will typically provision each of its subscriber devices with a "preferred roaming list" (PRL) that defines a priority order for each device to scan for available network coverage. The PRL will generally give higher priority to networks or systems operated by the home carrier than to networks or systems operated by roaming carriers, and the PRL may further define a priority order among roaming carriers. As the device scans for available coverage according to the PRL, the device will thus typically first scan for coverage of a home carrier network and, if the device does not succeed, will then scan for coverage of a roaming carrier network. In either case, once the device finds a suitable network, the device may then register for service with that network and then proceed to engage in communication service via that network.

In practice, when a subscriber device is not engaged in an active communication session (e.g., a voice call or data-session), the device may periodically scan the airwaves in search of a most preferred coverage area according to its PRL. Once the device finds such a coverage area, the device may then "idle" on the coverage area. In typical idle mode, the device will periodically scan air interface control channels of the coverage area in order to receive any relevant page messages. Further, if the device seeks to originate (initiate) a new communication session, the device would do so in the coverage area where it has been idling.

The rate or period at which a device scans for a more preferred system may be defined by a rescan timer (sometimes referred to as a "best system rescanning timer" or "BSR timer") programmed in the device. The rescan interval may be established based on a consideration of two competing factors. On the one hand, if the device is battery powered, then it would be best to use a relatively long rescan interval, since each rescan by the device consumes battery power. On the other hand, if the rescan interval is relatively long, then there is a greater likelihood that when the device originates a new communication, the device will do so in a system that is not the most preferred currently available, such as in a roaming system at a location where home coverage is just as well available but has not yet been detected by the device. By engineering design, a suitable rescan interval (e.g., 180 seconds) is therefore typically chosen and programmed in subscriber devices.

When a subscriber device is operating on its home system and moves to a border between home coverage and roaming coverage (e.g., in an area of overlap between the two), the device may begin to idle on the roaming system due to a loss of adequate home coverage. Once the device begins roaming, the device may then originate any new communications on the roaming system as noted above. Further, the device may not move back to idle on home system until the device performs a next BSR scan, and only then if the device thereby determines that home coverage is once again available.

OVERVIEW

The present disclosure stems from a realization that there may be situations when a roaming subscriber device that is about to originate a new communication session is within adequate home coverage but has not yet discovered that it is within home coverage. For instance, after beginning to roam due to loss of home coverage, the device may then regain home coverage (e.g., by moving into home coverage, or by home coverage extending to adequately cover the device's current location), but the device may not detect that fact until the device performs a next BSR scan. In that situation, as noted above, the device would unfortunately originate any new communication session in the roaming system, rather than in the home system.

One way to help minimize the chance of this occurring is to reduce the device's BSR rescan interval. However, as noted above, shortening the device's BSR interval may unfortunately result in more battery drain. Therefore, a better solution is desired.

Disclosed herein is a method and apparatus in which a subscriber device that is idling on a roaming system will determine whether to originate a communication in its home system rather than in the roaming system, based on an evaluation of how far the device is from where the device was when it successfully communicated to its home system, and perhaps further based on how long it has been since that successful communication occurred. If the device determines that it is threshold close to where it was when it successfully communicated to its home system, and perhaps further if the device determines that that successful communication occurred recently enough, then the device will responsively opt to originate its communication in the home system rather than in the roaming system. Otherwise, the device will opt to originate the communication in the roaming system.

To facilitate this method in practice, the device may keep track of its geographic location and the time when the device engages in communications to particular home system coverage areas. When the device is roaming and the device seeks to originate a communication session, the device may then refer to the stored location and time data, and the device may determine (i) a distance between the device's current geographic location and the location of the device when the device engaged in successful communication to its home system, and (ii) a duration from when the device last engaged in that successful communication to its home system. If the determined distance is threshold short and perhaps further if the determined duration is threshold short, then the device may responsively opt to originate the communication in the home system (and specifically in the home coverage area in which the device engaged in that last successful communication to its home system). Otherwise, the device may opt to originate the communication in the roaming system.

It is of course possible that, through this process, the device will determine that it should originate its communication in its home system but, upon attempting to do so, will fail for one reason or another. In that case, the device may then resort to originating the communication instead in the roaming system.

As a further advance, if the device decides through this method to originate its communication in a particular coverage area of its home system, the device may automatically set its initial transmit power for that origination to be the power level that the device used when it successfully communicated to that home coverage area (e.g., for the successful communication that occurred when the WCD was located a threshold distance from where the WCD is currently located). To facilitate this, the device may keep a record of its transmission power levels for communications to home coverage areas (e.g., at least the last such successful communication). If and when the device is then roaming and decides through this method to originate a call in the home coverage area to which the device successfully communicated, the device may refer to its record of what transmission power it used for a last instance of that successful communication, and the device may then use that transmission power for transmission of an origination request that home coverage area. Advantageously, this further advance may help to expedite origination by reducing the need for incremental power adjustments and multiple access probes during origination.

Although the present method will be described below principally in terms of roaming and as a means to allow a roaming device to decide to originate a communication in a home system, it will be understood that the disclosure may alternatively or more broadly involve a device deciding whether to originate a communication in its current serving system or rather in another particular system or even more broadly a device selecting between two systems. In that regard, when the device seeks to originate a communication, the device may determine whether it is threshold close to where it was located when it successfully communicated to a particular wireless system (e.g., a particular other coverage area, operated by the same or other carrier), and perhaps how long ago that successful communication occurred. If the device determines that it is threshold close to where it was located when it successfully communicated to that particular wireless system, and perhaps further that that successful communication occurred recently enough, then the device may responsively opt to originate the communication in that particular wireless system. Otherwise, the device may opt to originate the communication in another system (such as its current serving system).

Notably, the decision of whether to originate a call in one system or another (e.g., in a home coverage area or in a roaming coverage area) is not merely keyed to how far the device is from either such system and it not merely keyed to location of the device in relation to location of those systems. For instance, in the roaming/home scenario, the issue is not how far the device is from a home base station with which the device successfully communicated. Rather, the issue is how far the device is from where the device itself was located when the device engaged in a successful communication to a particular system (e.g., the home system), and perhaps further how long ago that successful communication occurred.

Further, the locations considered in this method are preferably geographic locations of the device itself, rather than representative geographic locations of serving nodes (e.g., base stations), coverage areas, or the like. Such geographic locations of the device can be determined through use of global positioning system (GPS) techniques, triangulation based on base station signal delay measurements, or other techniques now known or later developed.

These as well as other aspects, advantages, and alternatives will become apparent to those of ordinary skill in the art by reading the following detailed description, with reference where appropriate to the accompanying drawings. Further, it should be understood that the description provided throughout this document, including in this overview, is intended to explain the present method and apparatus by way of example and without limitation, and that numerous variations are possible.

DETAILED DESCRIPTION

Figure 1:
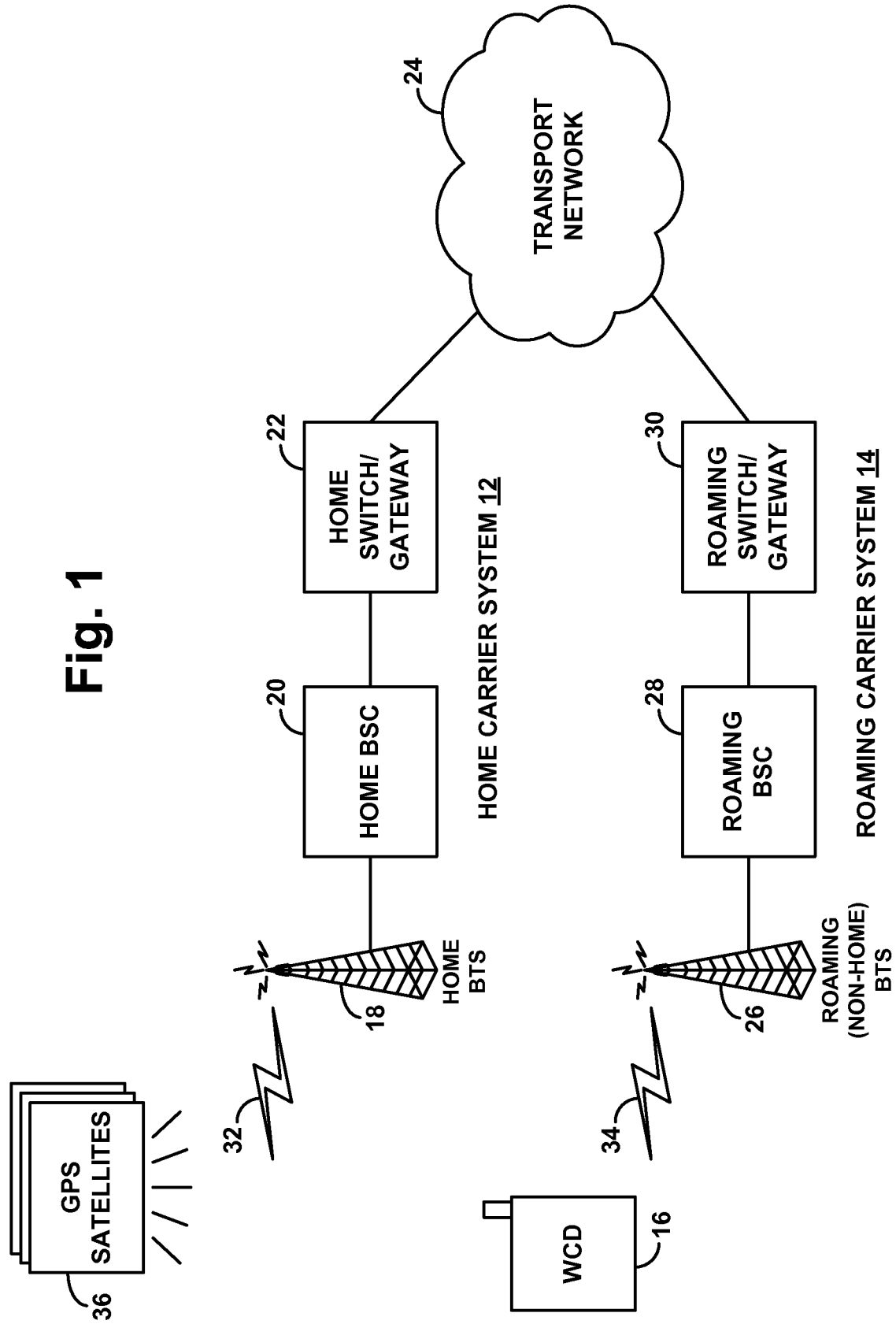
FIG. 1 is a simplified block diagram depicting a network in which an exemplary embodiment of the present method can be implemented.

As noted above, FIG. 1 is a simplified block diagram of a network in which an exemplary embodiment of the present method can be implemented. By way of example, the figure depicts a home carrier system 12 and a roaming carrier system 14, both situated to serve wireless communication devices (WCDs) such as a representative WCD 16.

The home carrier system 12 is shown including a home base transceiver station (BTS) 18, a home base station controller (BSC) 20, and a home switch or gateway 22 that provides connectivity with a transport network 24 such as the public switched telephone network (PSTN) and/or the Internet. Likewise, the roaming carrier system 14 is shown including a roaming BTS 26, a roaming BSC 28, and a roaming switch or gateway 30 that provides connectivity with the transport network. These representative system arrangements are of course merely examples, and it will be understood that numerous variations are possible, ranging from a rudimentary wireless access point router or other such serving device to a far more complex system.

In each representative system, the BTS includes one or more antennas or antenna arrangements that radiate to define one or more air interface coverage areas, such as cells or cell sectors, in which WCDs can communicate with the BTS. Each coverage area in the home carrier system may be considered itself a home wireless system or a home system coverage area. Likewise, each coverage area in the roaming carrier system may be considered itself a roaming wireless system or a roaming system coverage area. FIG. 1 conceptually depicts a representative home coverage area 32 provided by home carrier system 12 and a representative roaming coverage area 34 provided by roaming carrier system 14.

Each BSC may then be connected with and control one or more BTSs and may manage various aspects of air interface operation, such as handoffs between BTSs or the like. In some systems, a BSC may be integrated with a BTS to cooperatively define a "base station," or either component may be considered to provide "base station" functionality. Further, in some systems, similar functionality can be provided by a radio network controller (RNC) or other such component.

Each switch/gateway may then be connected with and control one or more BSCs or the like and may manage functions such as handoffs between BSC governed coverage areas or the like. Further, as noted above, the switch/gateway may provide connectivity with a transport network. For instance, a switch such as a mobile switching center (MSC) or media gateway may provide connectivity with the PSTN, and a gateway such as a packet data serving node (PDSN) may provide connectivity with a packet-switched network such as the Internet.

Communications in a given coverage area between a representative BTS and WCDs such as WCD 16 may define a "forward link" in the direction from the BTS to the WCD and a "reverse link" in the direction from the WCD to the BTS. The BTS and WCD may each be programmed or otherwise equipped to engage in such communications in accordance with an agreed air interface protocol, examples of which include CDMA (e.g., 1xRTT or 1xEV-DO), WiMAX, iDEN, LTE, GSM, TDMA, and others now known or otherwise developed. The air interface may define a number of discrete communication channels through a time division multiplexing, code division multiplexing, frequency division multiplexing, and/or other mechanism now known or later developed.

On the forward link in each coverage area, a typical air interface protocol may define a pilot signal that WCDs can detect as an indication of the presence of the coverage area and that WCDs can measure as a basis to determine the quality and sufficiency of available coverage. Each pilot signal may include or embody (e.g., be based on) an identifier of the coverage area (such as a pseudonoise offset (PN offset) and base station identifier, for instance), so that when a WCD detects the pilot signal, the WCD can associate the pilot signal with a particular coverage area. Further, the forward link may also define other air interface channels, such as broadcast control channels that provide data defining operational parameters for the coverage area, paging channels through which the BTS can direct control messages to particular WCDs, and traffic channels through which the BTS can transmit bearer traffic (e.g., voice data or other data) to served WCDs.

The reverse link in each coverage area may then likewise define various channels, such as access channels through which WCDs can transmit to the BTS access probes that define origination requests, registration requests or the like, and traffic channels through which WCDs can transmit bearer traffic to the BTS.

In practice, as noted above, an idle WCD may periodically scan for preferred coverage in accordance with a PRL programmed in the WCD. For instance, the PRL may define a priority order of frequencies on which home carrier systems and roaming carrier systems operate, and the WCD may cycle through those frequencies and, on each frequency, scan for available pilot signals. Through this process, the WCD may detect an adequate pilot signal on in a preferred system such as a home carrier system for instance. The WCD may then read overhead channel information provided by the coverage area, to learn any applicable operational parameters and perhaps to obtain further coverage area identification information. And the WCD may then continue to idle on the selected coverage area, monitoring for page messages and the like.

As further noted above, if and when the WCD seeks to originate a communication (e.g., upon detecting a trigger event such as user-pressing of a "Send" button or a scheduled origination), the WCD may then transmit on an access channel of its current coverage area an access probe that carries an origination request message. In accordance with some air interface protocols, this access probe transmission may occur at an initial power level that is either specified by an overhead system parameters message or is established based on the WCD's evaluation of forward link signal quality in the coverage area.

If the BTS and associated network infrastructure receives the access probe, the BTS may then transmit an acknowledgement message (e.g., a grant or denial, or a follow-up message) to the WCD, which may signify to the WCD that the access probe transmission was successful. Through that or additional signaling, the BTS or other network infrastructure may then assign a traffic channel (forward link and reverse link) for the requested communication session and may work to set up a connection on the transport network if applicable. The WCD would thereby transition to an active state, in which the communication may proceed.

For various reasons, however, the access probe may not successfully make it to the BTS. For instance, in an air interface protocol that defines the access channel as a series of timeslots that can hold access probes, WCDs would randomly select a time slot in which to transmit an access probe. If two or more WCDs consequently seek to transmit access probes in the same timeslot, a collision can occur, resulting in failure of the probes to arrive successfully at the BTS. As another example, due to noise or other issues on the air interface, the power level at which a WCD transmits an access probe may be insufficient to allow the access probe to arrive successfully at the BTS. If the WCD's access probe does not make it successfully to the BTS, the WCD may not receive any acknowledgement from the BTS and, after a defined waiting period, may therefore consider the access probe transmission to be a failure. In accordance with the air interface protocol, the WCD may then increase its access probe transmission power and re-transmit the access probe at the increased power level. This process may repeat a number of times as defined by the air interface protocol, until the WCD abandons the effort or cannot increase its transmission power further.

In the active state, when the WCD is engaged in bearer traffic communication with the BTS, a power control process may be applied in an effort to maintain the power level of transmissions (forward link and reverse link) at an optimal level, high enough to allow receipt by the other end but not so high as to unduly interfere with other air interface communications. As for reverse link communications, by way of example, the WCD may start its transmission of bearer data at a default initial transmission power level. The BTS (or other network infrastructure) may then regularly monitor the strength and error rate of bearer traffic being received from the WCD. Based on a comparison of the traffic strength with a power-control setup, the BTS may then regularly signal to the WCD to either incrementally increase or incrementally decrease the WCD's transmission power, and the WCD would adjust its transmission power accordingly. Further, based on a comparison of traffic error rate with a target error rate, the BTS may incrementally increase or decrease the power control setpoint. Through this process, the WCD's transmission power may reach an optimal level.

Moreover, in the active state, a fair assumption as a basic matter is that the WCD's communications to the BTS are successful. Exceptions to this may be if the WCD receives a retransmit-request from the BTS or other communicating endpoint or if the WCD expects to receive acknowledgements and does not receive one or more, or if the WCD otherwise determines that its bearer traffic communication to the BTS is unsuccessful for one reason or another.

FIG. 1 also depicts a set of positioning satellites 36, which may facilitate determination of the geographic location (e.g., latitude/longitude coordinates) of a WCD. These positioning satellites may be part of the Global Positioning System (GPS) or any other positioning system now known or later developed. In practice, a WCD that is equipped with a GPS receiver or the like may tune to receive signals from various GPS satellites in the sky over the WCD, and the WCD and/or a network-based positioning system (that may receive information from the WCD and report back to the WCD) may use those received signals as a basis to determine the WCD's geographic location with a high degree of accuracy. In some cases, the WCD may be equipped to regularly determine its location in this manner so as to keep track of its location. Alternatively, the WCD may determine its location when desired, such as for purposes of carrying out the present method.

At times, a WCD may be out of GPS coverage or otherwise unable to receive signals from positioning satellites. In that situation or when otherwise appropriate, the WCD may use compass and accelerometer technology (e.g., integrated in the WCD) to perform dead-reckoning based on a last known satellite-based position of the WCD. Alternatively or as a default matter, the WCD may be able to determine its location in other ways, such as through triangulation based on round-trip signal delay measurements with respect to base stations at known locations, through receipt of location reports from a location-determining node (e.g., portable navigation unit) carried by the user of the WCD, or through other techniques now known or later developed.

Figure 2:
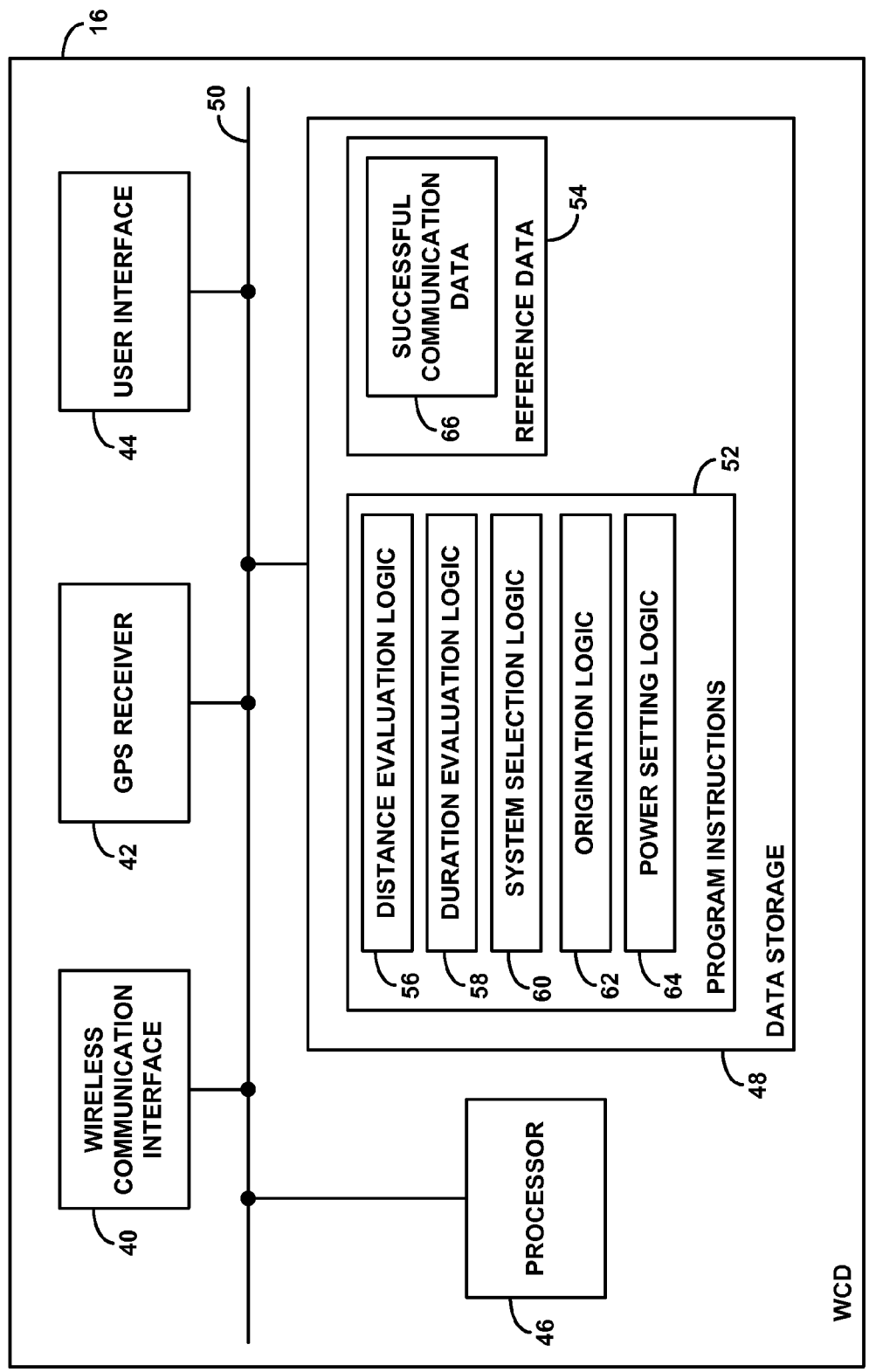
FIG. 2 is a simplified block diagram depicting functional components of an exemplary wireless communication device the may implement the present method.

FIG. 2 is next a simplified block diagram showing functional components that can be included in WCD 16. As shown, the exemplary WCD may include a wireless communication interface 40, a GPS receiver 42, a user interface 44, a processor 46, and data storage 48, all of which may be communicatively linked together by a system bus, network, or other connection mechanism 50. Like other entities disclosed in this document, the WCD can take other forms as well.

Wireless communication interface 40 functions to facilitate air interface communication with one or more wireless systems, such as with the base transceiver stations of a home carrier system 12 and a roaming carrier system 14 for instance. An exemplary wireless communication interface is an MSM series chipset manufactured by Qualcomm Incorporated, together with one or more internal or external antennas. The wireless communication interface is preferably arranged to engage in air interface communication according to one or more agreed air interface protocols, examples of which include those noted above.

GPS receiver 42 functions to communicate with GPS satellites 36, so as to facilitate determination of the location of WCD 16. Although GPS receiver 42 is shown separate from wireless communication interface 40, the GPS receiver can be integrated together with the wireless communication interface, on a single chipset for instance. By way of example, the chipset could be a Qualcomm cellular wireless chipset having "gpsOne" functionality. Other examples are possible as well.

User interface 44 includes components for receiving input from a user of the WCD and providing output to a user of the WCD. For instance, the user interface may include a keypad, touch-sensitive screen, microphone, and camera for receiving user input, and a display screen and speaker for providing user output. Further, the user interface may include analog/digital conversion circuitry to facilitate conversion between analog user input/output and digital signals on which the WCD can operate. Alternatively, the WCD might not include many or all of these user interface components, particularly if the WCD is a device that is not intended to be operated by or to interact with a user, such as if the WCD is integrated in other equipment (e.g., as a telematics device or other wireless-communication component).

Processor 46 comprises one or more general purpose processors (such as INTEL processors or the like) and/or one or more special purpose processors (such as digital signal processors or application specific integrated circuits). To the extent processor 46 includes more than one processor, the processors could work separately or in combination. Further, processor 46 could be integrated in whole or in part with wireless communication interface 40. For instance, a host processor of the WCD could function as a processor of the wireless communication interface 40, or one or more of the functions described herein as being carried out by processor 46 (by way of example) could be carried out by a processor or other logic on the wireless communication interface. In particular, the wireless communication interface could itself be arranged to carry out functions of the present method.

Data storage 48, in turn, comprises one or more volatile or non-volatile storage components, such as optical, magnetic, or organic storage, and data storage 48 can be integrated in whole or in part with processor 46. In an example implementation, data storage 48 contains program instructions 52 and reference data 54.

Program instructions 52 are preferably executable or interpretable by processor 46 to carry out various WCD functions described in this document. For instance, the program instructions may be executable by the processor 46 to maintain a record of where the WCD is located when the WCD engages in successful communication to home carrier system 12, when such successful communication occurred, and what power level the WCD used for that communication. As another example, the program instructions may be executable by the processor when the WCD, while roaming, detects a need to originate a communication, to use the present method to determine whether the WCD should originate the communication in the roaming system or rather in a home system.

More particularly, as shown, the program instructions 52 may define distance evaluation logic 56, duration evaluation logic 58, system selection logic 60, origination logic 62, and power setting logic 64. Distance evaluation logic 56 may function to determine a current distance of the WCD from a geographic location where the WCD successfully communicated (e.g., last successfully communicated) to a particular wireless system (e.g., a home coverage area). Duration evaluation logic 58 may function to determine a current duration from when the WCD successfully communicated (e.g., last successfully communicated) to a particular wireless system (e.g., a home coverage area). System selection logic 60 may function to make a decision of whether the WCD should originate a communication in the particular wireless system or rather in another wireless system, based at least on an evaluation of the determined current distance and perhaps further based on an evaluation of the determined current duration. Origination logic 62 may function to originate a communication according to the decision made by the system selection logic 60. And power setting logic 64 may function to use a stored record of the transmission power that the WCD used for the successful communication to the particular wireless system (e.g., home coverage area).

Reference data 54, in turn, comprises data the WCD may record and/or reference to facilitate carrying out various functions described herein.

By way of example, reference data 54 may comprise a table (or other data structure) 66 that lists home coverage areas to which the WCD successfully communicated and, for each such communication, designates (i) a coverage area ID, (ii) a geographic location where the WCD was positioned when the WCD engaged in the communication, (iii) a time when the communication occurred, and (iv) a power level at which the WCD engaged in the communication. In an example implementation, the table may list just the last such successful communication per coverage area.

What constitutes a WCD's successful communication to a home coverage area may be a matter of design and preference in a particular implementation of this method. For instance, the WCD could be set to consider as its successful communication to the home coverage area a successful traffic channel communication to the home coverage area (e.g., the WCD's last successful traffic channel communication to the home coverage area), regardless of any access channel communications by the WCD to the home coverage area. As another example, the WCD could be set to consider as its successful communication to the home coverage area a successful access channel communication to the home coverage area (e.g., the WCD's last successful access channel communication to the home coverage area), regardless of any traffic channel communications by the WCD to the home coverage area. And as another example, the WCD could be set to consider as its successful communication to its home coverage area any other successful communication that it made to its home coverage area.

In practice, each time the WCD engages in a successful communication to its home system (or, for the more general embodiment, to any particular system), the WCD may update this table of data to add or change an entry for the coverage area to which it engaged in the successful communication. In particular, the WCD may determine and record the identity of the coverage area sufficient to allow the WCD to communicate again with the coverage area. Further, the WCD may determine and record the WCD's current geographic location (preferably its own latitude/longitude coordinates), using techniques such as those described above for instance. Further, the WCD may determine and record a current time of day by reference to an internal WCD clock and/or GPS signaling information for instance. And still further, the WCD may determine and record the power level at which the WCD engaged in the communication.

In terms of transmission power, if the successful communication was an access probe that successfully reached the BTS of the coverage area, the WCD may record the access probe transmission power. Alternatively, if the successful communication was a traffic channel transmission that (presumably) successfully reached the BTS, the WCD may record the access probe transmission power for that transmission. Since the WCD's transmission power during an active communication session may fluctuate, it may be inefficient to constantly update this record for such a communication. In practice, the WCD may instead simply record its traffic channel transmission power at the conclusion of its active communication session (e.g., just before stopping the communication), or periodically, and may use that as an indication of the power level of its successful traffic channel communication to the coverage area.

Figure 3:
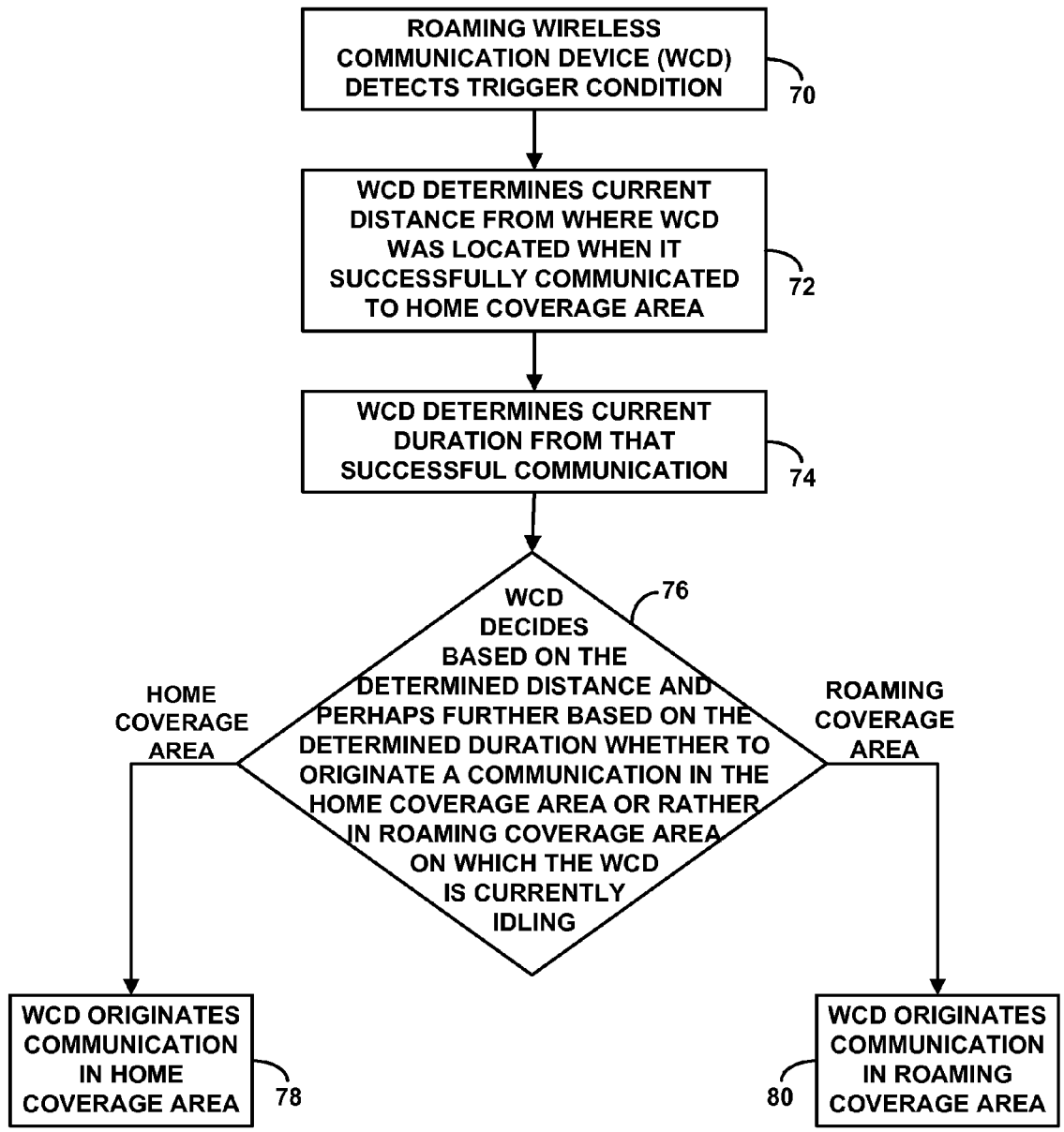
FIG. 3 is a flow chart depicting functions that can be carried out in accordance with the present method.

FIG. 3 is next a flow chart depicting functions that can be implemented by WCD 16 in accordance with the present method. As shown in FIG. 3, at block 70, the method may begin as the WCD detects a trigger condition. The trigger condition may take various forms and may include one or more parts or steps. By way of example the WCD may first detect a trigger for originating a communication, such as a user origination directive or an automated (e.g., scheduled) communication origination event. Further, perhaps in response to detecting a communication origination trigger, the WCD may determine that the WCD is currently roaming, such as by reference to a status indicator that was set in the WCD when the WCD began idling on a roaming system in accordance with its PRL. Responsive to detecting the trigger condition at block 70, the WCD may then carry out other aspects of the method.

At block 72, the WCD may then determine a current distance of the WCD from a geographic location where the WCD communicated to a particular wireless system, in this case any home coverage area. To do this, the WCD may determine its current geographic location using techniques such as those described above, and the WCD may then compare that location with various geographic locations listed in its table of successful communications 66, preferably to find a location in that table that is nearest to the WCD's determined current location. The WCD may then geometrically compute a distance between the WCD's determined current location and the indicated location of the successful communication to its home system.

At block 74, which may actually occur before or at the same time as the function of block 72, if at all, the WCD may further determine a current duration from when the WCD successfully communicated to the particular wireless system. For instance, the WCD may determine the current time of day and may refer to the time of day listed in the table entry for the identified successful communication and may compute a difference between those times so as to determine the duration since that successful communication.

At block 76, the WCD may then decide based on the determined current distance, and perhaps further based on the determined current duration, whether to originate the communication in the particular wireless system or rather in another wireless system. In particular, the WCD may determine based on the distance, and perhaps further based on the duration (or for that matter based on the duration and perhaps further based on the distance), whether to originate the communication in its current roaming coverage area or rather in the home coverage area to which it engaged in the successful communication.

The point here is that the WCD may determine if it is close enough to where it was located when it engaged in that successful communication to its home system, and if that successful communication occurred recently enough, that the WCD may likely be able to successfully communicate to that home system again, even though the WCD would otherwise not detect the presence of that home system until the WCD runs its next BSR scan. For this purpose, the particular distance and duration thresholds can be set (and programmed in the WCD) in advance by engineering design or could be dynamically established or adjusted through any desired means. (By way of example, the distance threshold might be set to a value in the range of 10-50 meters, and if the BSR rescan period is 180 seconds, the duration threshold might be set to a value less than 180 seconds.) In practice, the WCD may decide to originate the communication in the particular wireless system only if the WCD determines that the current distance is threshold short and perhaps further that the determined duration is threshold short and may otherwise decide to originate the communication in the other wireless system.

The WCD may then originate the communication in accordance with the determination at block 76. In particular, if the WCD thereby determines that it should originate the communication in the particular wireless system (e.g., a particular home coverage area), then at block 78 the WCD would originate the communication in that particular wireless system (e.g., the particular home coverage area). On the other hand, if the WCD thereby determines that it should originate the communication in the other wireless system (e.g., the roaming coverage area on which it is currently idling), then at block 80 the WCD would originate the communication in that other wireless system (e.g., the roaming coverage area). The act of "originating" at block 78 or block 80 does not necessarily mean successfully originating. Rather, it means engaging in an origination attempt. As noted above, it is possible that the WCD's origination may ultimately fail, in which case the WCD may resort to originating instead in a different system.

As noted above, if the WCD decides to originate the communication in the particular wireless system (e.g., a home coverage area) to which the WCD last successfully communicated, the WCD may endeavor to expedite the origination by using the reverse-link transmission power that the WCD used for that successful communication. The theory here, again, is that if the WCD is threshold close to where it was when that last successful communication occurred and if the communication occurred threshold recently enough, then the transmission power that the WCD used for that communication may be a reasonably good approximation of an optimal transmission power that the WCD can use for the new origination.

Thus, in practice, the WCD may refer to its table of successful communications 66 to determine the recorded power level at which it engaged in the identified successful communication to the particular wireless system (e.g., home coverage area). The WCD may then automatically use that power level as its transmission power for transmitting a first access probe seeking to originate the communication in the particular wireless system. Ideally, putting aside the risk of an access probe collision and other such factors, that transmission power level should suffice to get the access probe to the BTS so as to facilitate origination without the need for additional access attempts. However, if necessary, additional attempts at adjusted transmission power could be made as well.

An exemplary embodiment of the present invention has been described above. Those skilled in the art will understand, however, that changes and modifications may be made to the embodiment without departing from the true scope and spirit of the invention.

We claim:

1. A method for a wireless communication device (WCD) to originate a communication, the method comprising:
   the WCD determining a current distance of the WCD from a geographic location of the WCD where the WCD successfully communicated to a particular wireless system, wherein the geographic location of the WCD defines a geographic location of the WCD itself rather than a geographic location of the particular wireless system;
   the WCD determining a current duration from when the WCD successfully communicated to the particular wireless system;
   the WCD making a decision, based on at least the determined current distance and the determined current duration, of whether the WCD should originate the communication in the particular wireless system or rather in another wireless system, wherein making the decision based on at least the determined current distance and the determined current duration comprises deciding to originate the communication in the particular wireless system only if the determined current distance is threshold short and the determined current duration is threshold short, and otherwise deciding to originate the communication in the other wireless system; and
   the WCD originating the communication according to the decision.

2. The method of claim 1, wherein the geographic location of the WCD is a geographic location of the WCD where the WCD last successfully communicated to the particular system.

3. The method of claim 1,
   wherein the particular wireless system is a home system operated by a home wireless service provider to which the WCD subscribes and with which the WCD has a service account under which the WCD operates, and
   wherein the other wireless system is a non-home system operated by a wireless service provider other than the home wireless service provider, wherein, when making the decision, the WCD is currently roaming in the other wireless system.

4. The method of claim 3, wherein the particular home system is a cell sector of the home system.

5. The method of claim 3, further comprising:
   the WCD detecting a trigger for originating the communication;
   the WCD making a determination that the WCD is currently roaming; and
   responsive to the determination that the WCD is currently roaming, the WCD carrying out the (i) determining the current distance and the current duration, (ii) using at least the determined current distance and the determined current duration as bases to make the decision, and (iii) originating according to the decision.

6. The method of claim 1, further comprising:
   the WCD making a record of a reverse-link transmission power that was used by the WCD to communicate to the particular wireless system when the WCD successfully communicated to the particular wireless system; and
   if the decision is to originate the communication in the particular wireless system, then the WCD using the record as a basis to establish an initial transmission power to use for communicating to the particular wireless system.

7. The method of claim 6,
wherein originating the communication comprises transmitting an initial access probe on a reverse access channel, and
wherein using the record as the basis to establish the initial transmission power comprises transmitting the initial access probe at the recorded reverse-link transmission power.

8. The method of claim 6, wherein the WCD's successful communication to the particular wireless system was an access probe transmission, and wherein the recorded reverse-link transmission power is a dynamically adjusted power at which the WCD engaged in that access probe transmission.

9. The method of claim 6, wherein the WCD's successful communication to the particular wireless system was a reverse traffic channel transmission, and wherein the recorded reverse-link transmission power is a dynamically adjusted power at which the WCD engaged in that transmission on the reverse traffic channel.

10. The method of claim 1, wherein the WCD includes a global positioning system (GPS) receiver, the method further comprising:
the WCD using the GPS receiver to determine the geographic location of the WCD where the WCD successfully communicated to the particular system; and
the WCD recording the determined geographic location of the WCD where the WCD successfully communicated to the particular system,
wherein determining the current distance of the WCD from the geographic location of the WCD where the WCD successfully communicated to the particular wireless system comprises: (i) using the GPS receiver to determine a current geographic location of the WCD, and (ii) comparing the determined current geographic location with the recorded geographic location, to establish the current distance.

11. The method of claim 1, wherein originating the communication according to the decision comprises:
if the decision is to originate the communication in the particular wireless system, then transmitting an origination request to the particular wireless system; and
if the decision is to originate the communication in the other wireless system, then transmitting an origination request to the other wireless system.

12. The method of claim 11, wherein if the decision is to originate the communication in the particular wireless system and the WCD therefore transmits the origination request to the particular wireless system, the method further comprises:
the WCD detecting that the particular wireless system does not respond to the origination request that the WCD transmitted to the particular wireless system, and the WCD responsively then originating the communication in the other wireless system.

13. A method for a wireless communication device (WCD) to manage origination of a communication while the WCD is roaming in a non-home system, the method comprising:
the WCD determining whether a distance between a current geographic location of the WCD and a geographic location where the WCD was when the WCD engaged in successful communication to a home system of the WCD is threshold short, wherein the geographic location of the WCD where the WCD was when the WCD engaged in successful communication to the home system defines a geographic location of the WCD itself rather than a geographic location of the home system;
the WCD determining whether a duration between a current time and a time when the WCD engaged in the successful communication to the home system is threshold short; and
if the WCD thereby determines that the distance is threshold short and the duration is threshold short, then the WCD originating the communication in the home system, and otherwise the WCD originating the communication in the non-home system.

14. The method of claim 13, wherein if the WCD determines that the distance is threshold short and the duration is threshold short, then the WCD using as initial power for transmission to the home system a transmission power that the WCD recorded from the successful communication by the WCD to the home system.

15. A wireless communication device (WCD) comprising:
a wireless communication interface for engaging in air-interface communication with base transceiver stations, wherein the wireless communication interface includes an antenna;
distance evaluation logic for determining a current distance of the WCD from a geographic location of the WCD where the WCD successfully communicated to a particular wireless system, wherein the geographic location of the WCD defines a geographic location of the WCD itself rather than a geographic location of the particular wireless system;
duration evaluation logic for determining a current duration from when the WCD successfully communicated to the particular wireless system,
system selection logic for making a decision of whether the WCD should originate a communication in the particular wireless system or rather in another wireless system, wherein the system selection logic being arranged to make the decision based at least on an evaluation of the determined current distance and based further on an evaluation of the determined current duration; and
origination logic for originating the communication according to the decision.

16. The WCD of claim 15, wherein the particular wireless system is a home system of the WCD, and the other wireless system is a non-home system of the WCD in which the WCD is roaming when the WCD makes the decision.

17. The WCD of claim 15, further comprising:
data storage for storing a record of transmission power used by the WCD when the WCD successfully communicated to the particular wireless system; and
power setting logic for using the stored record of the transmission power as a basis to set an initial transmission power to use for originating the communication in the particular wireless system.

* * * * *